No. 810,212. PATENTED JAN. 16, 1906.
W. C. MORGANS & T. GILLOON.
BALE BINDER AND TIER.
APPLICATION FILED NOV. 23, 1904.
5 SHEETS—SHEET 5.
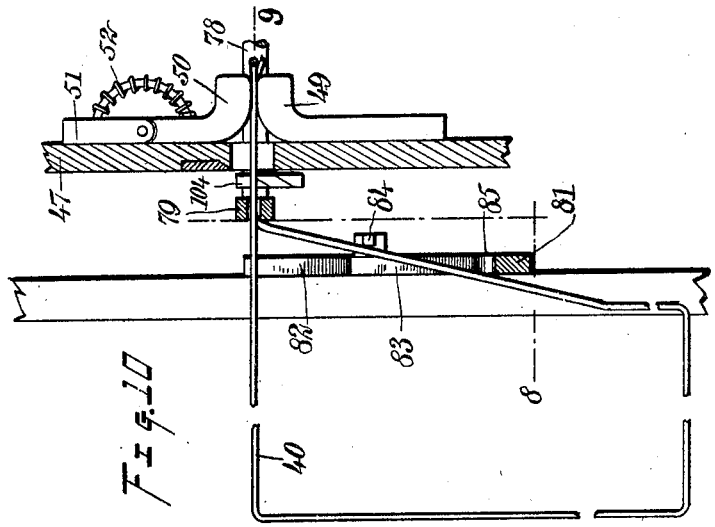
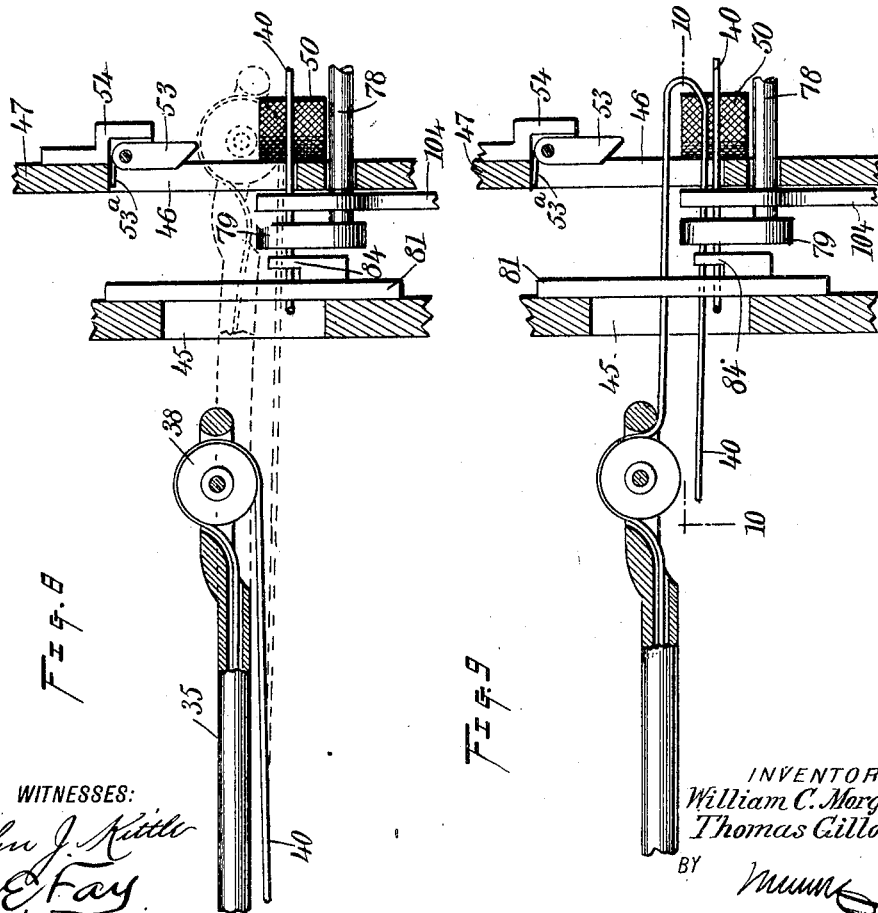
WITNESSES:
John J. Kittle
A. E. Fay
INVENTORS
William C. Morgans
Thomas Gilloon
BY
ATTORNEYS

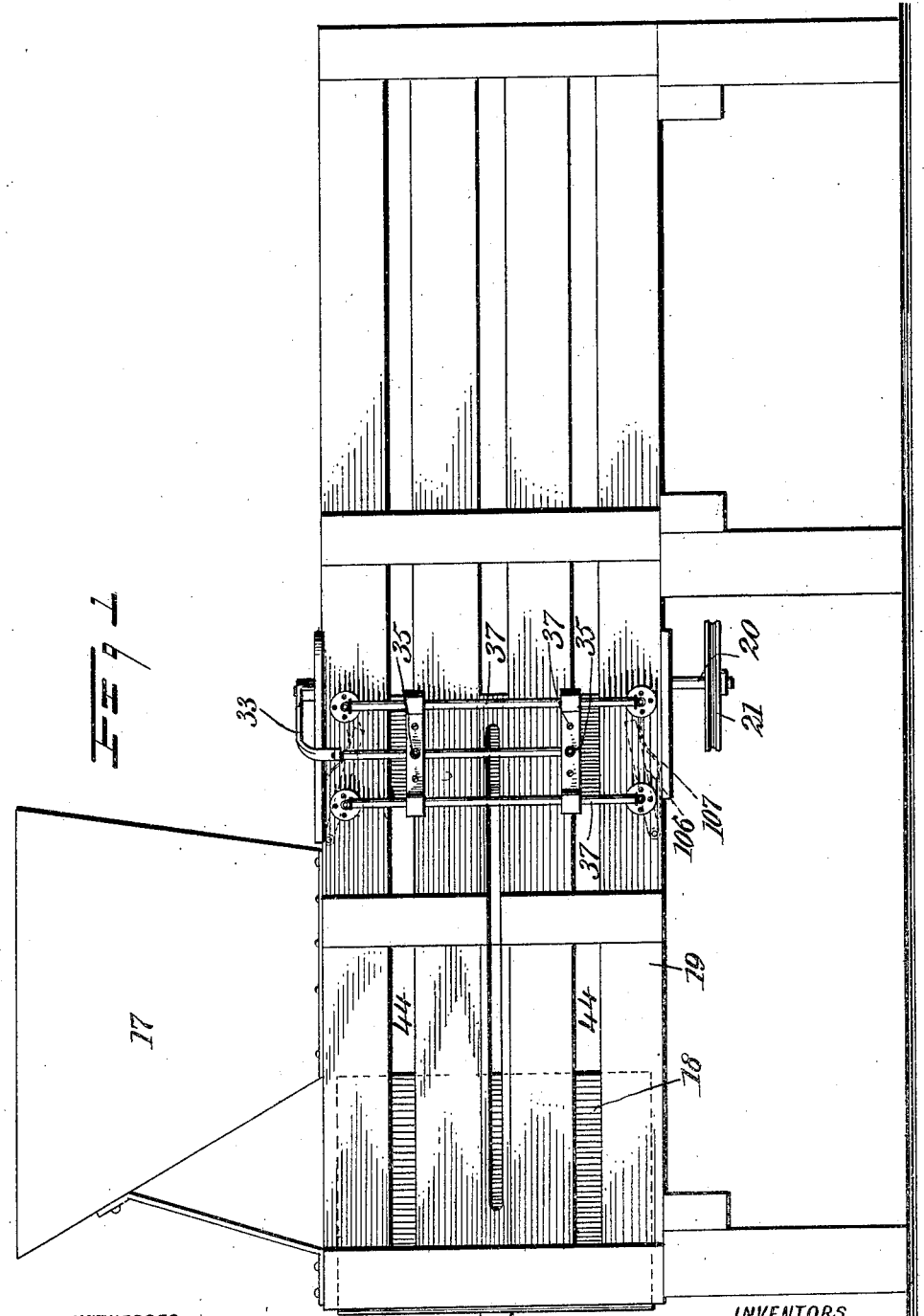

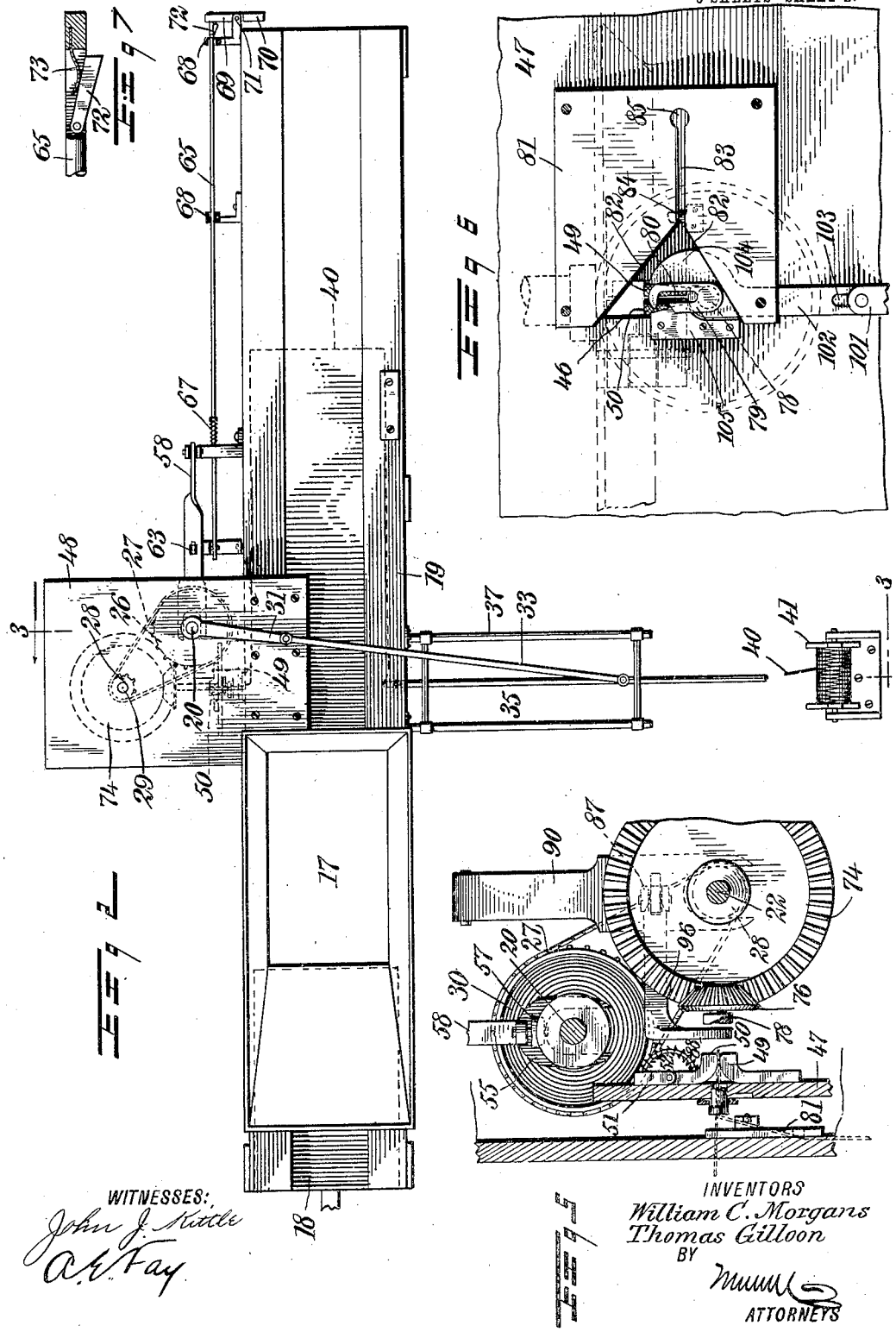

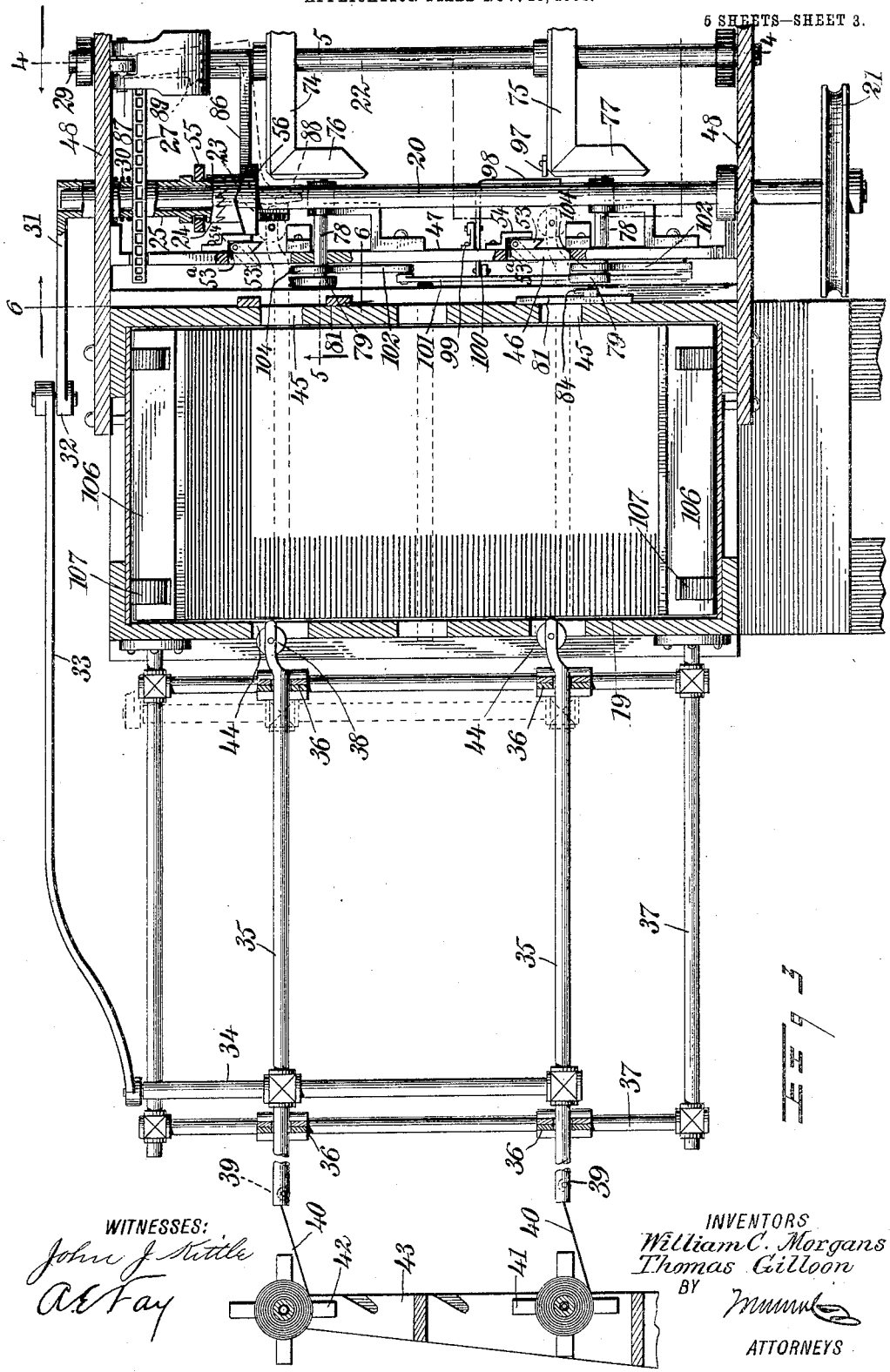

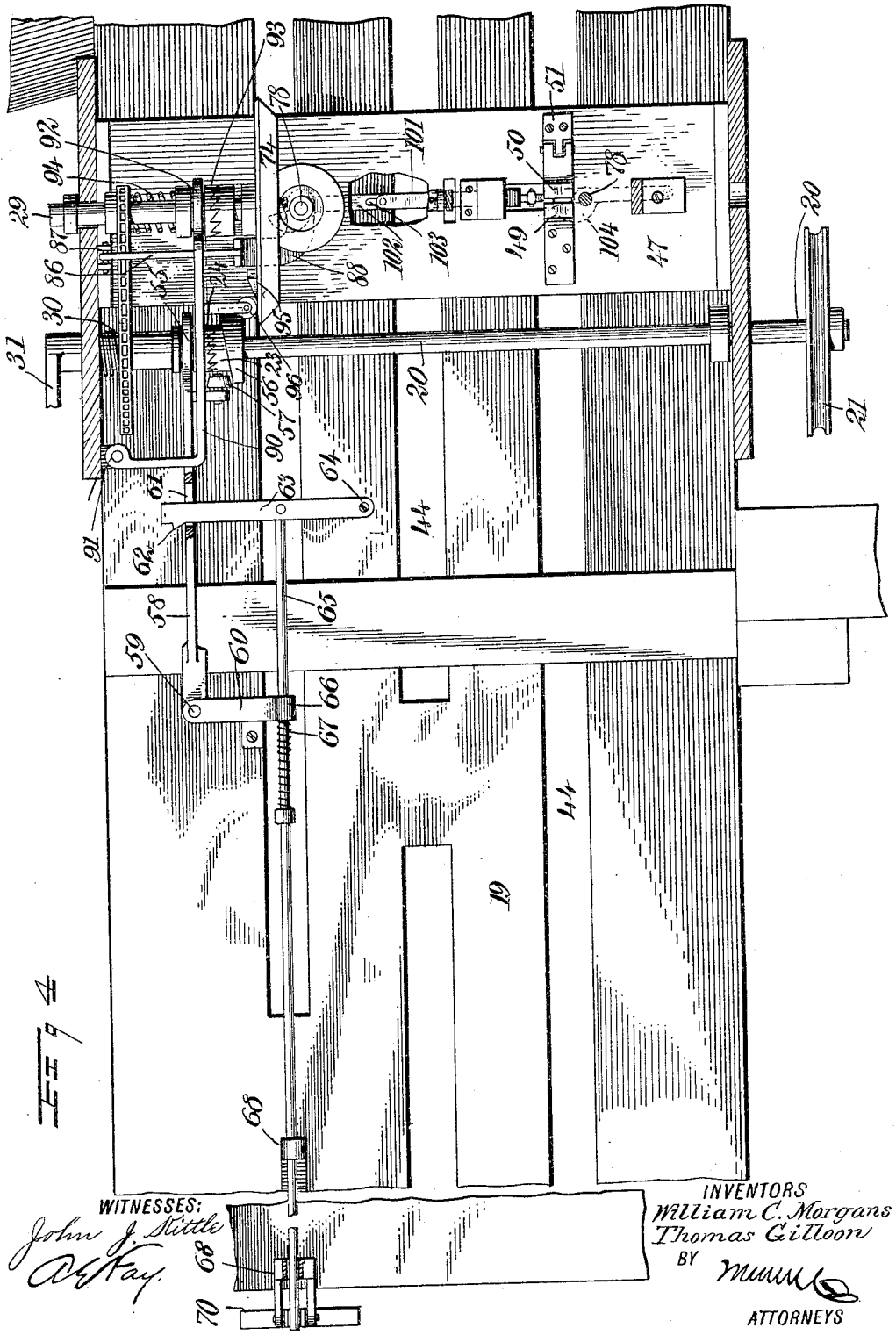

UNITED STATES PATENT OFFICE.

WILLIAM CHARLES MORGANS AND THOMAS GILLOON, OF DUBUQUE, IOWA.

BALE BINDER AND TIER.

No. 810,212.  Specification of Letters Patent.  Patented Jan. 16, 1906.

Application filed November 23, 1904. Serial No. 233,984.

*To all whom it may concern:*

Be it known that we, WILLIAM CHARLES MORGANS and THOMAS GILLOON, citizens of the United States, and residents of Dubuque, in the county of Dubuque and State of Iowa, have invented a new and Improved Bale Binder and Tier, of which the following is a full, clear, and exact description.

Our invention relates to a device for automatically binding and tying bales of hay, straw, and the like. It is intended to be mounted upon the frame of any power baler or one that has a self-feeding arrangement, and it is so arranged that power may be taken from any shaft of the baler, according to the style and construction thereof.

Among the objects of our invention are the following: to increase the capacity of the baler, to save the services of a man to do the tying, to save in the length of wire employed, and therefore in the cost of the wire, this being accomplished by using ordinary smooth wire instead of that especially employed for bale-ties, to do away with bale-blocks, to make an even-sized bale, and to save time in the whole operation.

Our invention comprises means for gripping one end of a wire so that a bale upon being pressed against it will cause the wire to extend around three sides of it, means for taking the other end of the wire around the bale and passing it into proximity to the stationary end, means for securing the wires together at this point, and means for cutting off the wire.

Reference is to be had to the accompanying drawings, forming a part of this specification, in which similar characters of reference indicate corresponding parts in all the figures.

Figure 1 is a side elevation of a portion of a baler with a practical embodiment of the invention applied thereto. Fig. 2 is a plan view of the same on a smaller scale. Fig. 3 is a sectional view on the line 3 3 of Fig. 2. Fig. 4 is a sectional view on the line 4 4 of Fig. 3. Fig. 5 is a sectional view on the line 5 5 of Fig. 3. Fig. 6 is a sectional view on the line 6 6 of Fig. 3. Fig. 7 is a fragmentary enlarged view of a detail. Figs. 8 and 9 are sectional views on the line 8 9 of Fig. 10, showing the parts in two positions; and Fig. 10 is a sectional view on the line 10 10 of Fig. 9.

The drawings show a hopper 17, by means of which the device is supplied with hay, straw, or any material upon which it is desired to operate and with a plunger 18 passing along the frame 19 of the apparatus under the hopper, so as to force the material to be operated upon intermittently forward. The reciprocating operation of the plunger causes the material to be fed in bundles or bales to the apparatus for binding and tying them. For operating the plunger 18 any usual or desired mechanism may be employed, and we have not illustrated a particular form.

A shaft 20, which may be called the "main" shaft of the apparatus, is preferably driven from the baler by means of a belt running over a pulley 21 thereon continuously in one direction. This shaft is conveniently so timed as to make one revolution while the plunger makes two strokes. A second shaft 22 is mounted parallel with the shaft 20 and is driven therefrom. Upon the shaft 20 is rigidly mounted a clutch member 23. The mate 24 to this clutch member is mounted on a sleeve 25, through which the shaft passes freely. On the sleeve 25 is mounted a sprocket-wheel 26 for driving a chain 27, which meshes with a wheel 28 on a shaft 29. The shaft 29 is a continuation of the shaft 22 and drives it, as will be described later. These two shafts are regarded as two parts of one shaft and will be so mentioned hereinafter. A spring 30 is employed to force the clutch member 24 into engagement with the clutch member 23.

Upon the sleeve 25 is an arm 31, having a pivotal connection at 32 with a connecting-rod 33. This rod is pivoted to a frame 34, upon which are mounted needles 35. These needles reciprocate in bearings 36 upon a stationary frame 37 and are provided with small wheels or pulleys 38 and 39. The needles are hollow throughout their length, so that wires 40 may pass through them, running over the pulleys 38 and 39. The wires are preferably mounted upon reels 41 and 42, these being located upon a frame 43, so that they can rotate in one direction. The frame 19 is provided with openings 44 and 45, through which the needles are adapted to pass when the frame 34 is reciprocated by means of the arm or crank 31. Openings 46 are also provided in an auxiliary frame 47, which is mounted upon a side frame 48, that is in turn mounted upon the main frame of the baler. The openings 46 are in registration with the openings 44 and 45, so that the needles can pass through all three openings in succession. It is to be understood that a wire extends through each needle and that its end is fastened in a way which will be described below, so that the wire passes around the bale which is being forced to the right in Fig. 2. Consequently the forcing of the needles inward through the openings mentioned will cause the wires to be unwound from the reels and will carry a portion of each wire on both sides of each needle through the opening. In order to retain the wires in the position which they acquire upon being forced to the position shown in dotted lines in Fig. 3, a gripping device is provided. This gripping device comprises in our preferred form a pair of serrated jaws 49 and 50. (See Figs. 4 and 5.) The jaw 49 is rigidly mounted upon the frame 47, and the jaw 50 is pivoted to a block 51, which is secured upon the frame and is provided with a spring 52 or other holding device for normally holding it in the position shown in Fig. 5. When the wire is forced through the space between the two jaws, the jaw 50 will yield and allow the wire to pass to the rear of the machine; but when it is attempted to draw the wire back this jaw will be pulled downward upon its pivot, and the greater the pull upon the wire the greater the force exerted to keep it from being pulled out of the jaws. The end of the needle is forced toward the jaws by a beveled guide 53, pivoted to the frame and limited by a stop 54 in one direction. A spring 53ª tends to keep the guide against the stop, but permits the wheel 38 to push the guide aside on its return stroke. It may be so constructed that only the wire which extends between the wheel 38 and the face of the needle will be allowed to come into contact with the working surfaces of the jaws. In either case the wire will be allowed to pass into its desired position and will then be gripped to prevent it from returning.

For operating the clutch 23 24 a shifter 55 is employed. It is designed to be operated by means of a cam 56, secured to the shaft 20, and a wheel 57, secured to a pivoted bar 58, upon which the shifter is mounted. This bar is pivoted at 59 to a bracket 60, secured to the frame of the machine. The bar is preferably provided with an opening 61, with which is adapted to engage a projection or tooth 62 upon an arm 63, which is pivoted at 64 to the frame of the machine. A sliding rod 65 is pivotally connected to this arm and operates in a guide 66 upon the bracket 60, a spring 67 being provided for the purpose of keeping the arm in inoperative position and returning it to an inoperative position after it has been moved. The bar slides in guides 68 upon the frame and has a slight movement in a bar 69, which is provided with a projecting end 70 and is pivoted to a bracket 71 upon the frame. Upon the rod is a pivoted latch 72, adapted to be retained in operative position by means of a spring 73. (See Fig. 7.) This latch normally engages the bar 69, so that the motion of the latter in one direction will be transmitted to the bar 65. The operation of this part of the device is as follows: Upon a bale being forced out to the end of the machine, where it can drop therefrom, it comes in contact with the projection 70, which forces the bar 69 inwardly at its upper end and moves the rod 65 toward the shaft 20. This operates the arm 63, which in its normal position is so located that its projection 62 engages with the lower edge of the bar 58 through the hole 61 and holds it in elevated position irrespective of the operation of the cam 56 upon the wheel 57, which, as will be obvious, was used for the purpose of elevating the arm 58 to a position where it could be engaged by the projection 62. Upon the movement of the rod 65 in the direction indicated the projection 62 will be disengaged from the bar 58 and permit it to drop, and this will start the upper end of the shaft 20 to rotating and cause the arm 31 to move the frame 34 and needles 35 in the manner indicated above. After the operation has proceeded far enough to permit the cam 56 to again raise the roller 57 the frame 34 will be thrown out of gear in an obvious manner and will remain out of gear if the arm 69 has returned to its normal position, which it will do on account of the operation of the spring 67 if the bale has by that time been dropped from the machine.

Upon the shaft 22 are a pair of bevel-gears 74 and 75, which mesh with gears 76 and 77 upon a pair of shafts 78. These shafts are preferably located in parallel relation to each other and are journaled upon the frame 47 in any desired manner. Each shaft is provided with a twisting device 79. These twisting devices, as shown in Fig. 6, are each provided with a slot 80, adapted to receive a wire, and it will be readily understood that the rotation of the shafts 78 will cause the wires to be twisted together. For the purpose of guiding the wires a plate 81 is secured to the frame 19. This plate is provided with a triangular opening 82 and a slot 83. A bar 84 is placed behind the slot, and the slot has an enlarged opening 85 at its end.

Means is provided for automatically starting the shaft 22 when the needles are projected into the position shown in dotted lines in Fig. 3. This means comprises an angle-iron 86, pivoted at 87 to the frame 48 and provided with an end piece 88, adapted to be engaged by the end of one of the needles. This angle-iron is also provided with a projection 89, which engages with a second angle-iron 90, pivoted at 91 to the frame 48 and provided with a shifter 92 for a clutch 93, by means of which the outer part 29 of the shaft 22 is connected with the main part of the shaft. A spring 94 is employed for normally keeping the clutch in operative position.

Upon the rear of the gear 74 is an inclined cam-surface 95, operating a roller 96, rotatably mounted upon the angle-iron 90. It will be readily seen that the rotation of the shaft 22 and gear 74 will cause the roller 96 to ride up the inclined plane of the cam-surface 95 once in each revolution and disengage the clutch 93 from the shaft 22. The angle-iron 86 hangs in such position that when this operation occurs the projection 89 engages with the angle-iron 90 and holds it in elevated position; but when the upper needle 35 comes in engagement with the projection 88 it will disengage the projection 89 from the angle-iron 90 and allow the clutch 93 to be forced into operative position by means of the spring 94.

The gear 75 is provided with a projection 97, which engages with a lever 98, pivoted at 99 to the frame 47 and also pivoted at the point 100 to a connecting-rod 101. The connecting-rod operates two arms 102 by means of a pin-and-slot connection 103. Each of these arms is provided with a blade 104, adapted to be oscillated upon a pivot and operating in conjunction with a stationary blade 105 for the purpose of shearing off the wires at the desired point in the operation of the device.

In the frame of the machine are a pair of gates 106, forced inwardly by means of springs 107. These gates yield to permit the bale to pass; but when it has passed they spring outwardly and hold the stalks of which the bale is composed in position and keep them from returning. It is at this point that the needles pass between two bales. Of this embodiment of our invention the operation will now be described.

The shaft 20 constantly receives power from the pulley 21. Let it be assumed that the clutches 24 and 93 have been opened by the cams 56 and 95 and are held in open position by the projections 62 and 89, respectively. The sleeve on the shaft 20, will consequently be stationary, and so will the shaft 22, the latter being stopped in the position shown in Fig. 2. The plunger 18 is operated by the shaft of the baler (not shown) and makes two strokes to one rotation of the shaft 20. Let it be assumed that before the bale is pushed forward by the plunger the ends of the wires passing through the needles are clamped in the two pairs of jaws 49 and 50. Upon forcing the bale forward it will be readily understood that it encounters the two wires and pulls them forward with it, so that when the plunger has reached the end of its stroke the wires will extend around three sides of the bale and that if the needles are then pushed forward they will carry the wire along the fourth or rear side of the bale to the jaws, which grip both ends of the wires. When the bale encounters the extension 70 of the arm 69, the arm 63 will be moved to release the projection 62 from the shifter 58 and cause the clutch 24 to close. This will cause the sleeve 25 to rotate and start the needles through the operation of the arm 34. The part 29 of the shaft 22 is also rotated simultaneously, and by the time the plunger has been entirely retracted the needles will reach the extreme position shown in dotted lines in Fig. 3, in which one of them trips the angle-iron 86 and closes the clutch 93 to start the twisters. The shaft 22 is preferably geared up so as to make one revolution to five of the shafts 78. Therefore before the shaft 22 is automatically stopped the wires will have been twisted five times. As soon as the twisters have secured the wires in the slots 80 the projections 97 come into engagement with the levers 98 and cause the two shears to cut off the wires. This is done to prevent the wires from being wrapped around the twister-shafts. When the twisters are in operation, the two ends of each wire are gathered together at the open end of the slot 83, one end passing over the bar 84 and out through the opening 85 to the front of the bale and the other passing on the other side of the bar 84. This prevents a long twist being made in the wire and keeps the rear wire out of the opening 85. When the wires are cut off and twisted, the twisted portion passes between the plate 81 and the bar 84; but it cannot pass through the slot 83 until it reaches the opening 85, which permits it to pass through. The cams 56 and 95 automatically throw the clutches 24 and 93 after the twisting is completed and when the needles are withdrawn to their accustomed position. These parts then remain stationary while the plunger again moves forward. It will be understood that as the needles move forward in the manner stated they carry a wire upon each side, and the gripping device grips the wire between the two portions on the two sides of the needles. The shears cut off only one of these wires, and the other one being held by the grips is left extending across the space through which the next bale must pass when the needles are withdrawn. It will be seen that the twister as it starts to revolve draws the two wires into the slot 80 and holds them there until the five revolutions are completed. After the twisting is done and the plunger pushes the bale out of the machine these wires are pulled out of the slot. The bar 84 across the slot 83 is employed for keeping the wires from getting into the hole 85 and also for providing for a tight twist.

It will be readily understood that our invention may be embodied in many other forms than that shown in the drawings and described in detail and that many modifications may be made in the embodiment illustrated without departing from the spirit of the invention.

Having thus described our invention, we claim as new and desire to secure by Letters Patent—

1. A bale-binder having a gripping device comprising a pair of jaws, one of said jaws being pivotally mounted and having resilient means for forcing it in one direction.

2. A bale-binder having a gripping device, comprising a pair of jaws, one of said jaws being stationary and the other being pivoted, a curved bar formed on the arc of a circle, with the point at which the second jaw is pivoted as a center, and a spring surrounding said bar and guided thereby, said spring being adapted to force the pivoted jaw into position opposite the stationary jaw.

3. In a bale-binder, the combination of a frame, means for moving material along the frame, a gripping device located at one side of the frame, and a needle for holding wire and advancing it across the frame to the gripping device; said gripping device comprising a pair of jaws, one of said jaws being pivoted and having means for forcing it toward the other.

4. In a bale-binder, the combination of a frame, means for moving the material therealong, a gripping device for securing the end of the wire in front of the material, and a needle for holding the wire and advancing it across the material, said needle comprising a tube through which the wire passes; said gripping device comprising a pair of jaws, one of said jaws being pivotally mounted and having holding means for forcing it in one direction.

5. In a bale-binder, the combination of means for moving material to be formed into a bale, a gripping device for receiving the end of a wire and holding it in front of the material, means for advancing a wire across the space through which the material passes, into contact with the first-mentioned wire, means for twisting the wires together, said last-named means comprising a rotary shaft and a projection on the shaft having a slot for the wires, means for rotating said shaft comprising gearing connected therewith, and means for automatically stopping said shaft; comprising an inclined plane mounted upon the gearing, a roller adapted to be moved by said inclined plane, and a clutch connected with said roller.

6. In a bale-binder, the combination of means for moving material to be formed into a bale, a gripping device for receiving the end of a wire and holding it in front of the material, means for advancing a wire across the space through which the material passes, into contact with the first-mentioned wire, means for twisting the wires together; said last-named means comprising a rotary shaft and a projection on the shaft having a slot for the wires; a guide-plate located adjacent to said twisting means and adapted to receive the wires, and means for forcing the wire-advancing means toward the gripping device.

7. In a bale-binder, the combination of means for moving material to be formed into a bale, a gripping device for receiving the end of a wire and holding it in front of the material, means for advancing a wire across the space through which the material passes, into contact with the first-mentioned wire, means for twisting the wires together; said last-named means comprising a rotary shaft and a projection on the shaft having a slot for the wires; and a guide-plate located adjacent to said twisting means and adapted to receive the wires, said plate having a V-shaped opening to guide the wires into it, a slot at the bottom of said opening, and a bar extending across said slot.

8. In a bale-binder, the combination of means for twisting wires together, comprising a rotary shaft and a projection on the shaft having a slot for the wires and a guide-plate located adjacent to said twisting means and adapted to receive the wires, said plate having a V-shaped opening to guide the wires into it, a slot at the bottom of said opening, and a bar extending across said slot.

9. A bale-binder having a gripping device, a twisting device and a guide-plate located adjacent to said twisting device, said plate having a V-shaped opening located in front of the twisting device, a slot at the apex of said opening and extending therefrom, said slot being of sufficient width to allow the passage of a single wire but to prevent the passage of two wires twisted together, an opening at the end of the slot for permitting the passage of twisted wires, and a bar across the opening to prevent the wires from passing through it at certain times.

10. A bale-binder, comprising means for twisting wires together, said means having a rotary shaft and a projection on the shaft having a slot for the wires, means for rotating said shaft comprising gearing connected therewith, and means for automatically stopping said shaft, comprising an inclined plane mounted upon the gearing, a roller adapted to be moved by said inclined plane, and a clutch connected with said roller.

11. A bale-binder, comprising means for twisting a plurality of wires together and consisting of a rotary shaft, and a projection extending at right angles to the shaft and having a slot for receiving the wires, said slot being closed at its end and open at one side.

12. In a binder, the combination of means for moving material adapted to be formed into a bale, means for securing the end of a wire in front of the material, a needle for holding the wire and advancing it across the material, said needle comprising a tube through which the wire passes, and a cutter located adjacent to said securing means, for shearing the wire; said cutter comprising a pivoted blade and means for operating said blade comprising a link and a lever.

13. In a binder, the combination of means for moving material adapted to be formed into a bale, means for securing the end of a wire in front of the material, a needle for holding the wire and advancing it across the material, said needle comprising a tube through which the wire passes, and a cutter located adjacent to said securing means, for shearing the wire; said cutter comprising a pivoted blade, automatic means for oscillating said blade upon its pivot, and automatic means for throwing said oscillating means out of gear.

14. In a binder, the combination of means for moving material adapted to be formed into a bale, means for securing the end of a wire in front of the advancing material, a needle for holding the wire and advancing it across the material, and a cutter located adjacent to said securing means for shearing the wire; said cutter comprising a movable blade, means for moving the blade, and automatic means for throwing the moving means out of gear.

15. The combination of a main shaft, a second shaft, connections between said shafts for transmitting motion from one to the other, a clutch between said connections and the main shaft, means for automatically throwing said clutch out of operative position, a needle for wire, connections between the main shaft and said needle for reciprocating the needle, a plunger, connections between the main shaft and the plunger for operating the latter, a clutch for disengaging said connections from the plunger, and automatic means for operating said clutch.

16. The combination of a main shaft, a second shaft, a clutch on said main shaft whereby a portion thereof may be thrown out of engagement with the remainder, connections between said main shaft at a point beyond the clutch and the second shaft, a clutch member in the said second shaft, means for throwing said last-named clutch member, a gear on said second shaft, a cam-surface on the gear, means for causing said cam-surface to automatically throw said last-named clutch out of operative position, a shaft operatively connected with said gear, and a twisting device mounted on said last-named shaft.

17. In a bale-binder, the combination of a main shaft, a needle, means connected with the main shaft for intermittently forcing the needle across the binder, a bar having a projection located in the path of the material to be moved through the machine, a reciprocating bar having a catch adapted to be engaged by said first-named bar, whereby the motion of the first-named bar caused by the advancing material will reciprocate the second bar, and means connected with the second bar for disconnecting the main shaft from the needle.

18. In a bale-binder, the combination of a shaft, a needle, an arm connected with the needle, a clutch between the shaft and the arm, a plate for operating said clutch, a reciprocable bar having means for engaging said plate and holding the clutch in disconnected position, and means for manipulating said bar when a bale is forced from the machine.

19. In a bale-binder, the combination of a main shaft, a needle, means connected with the main shaft for reciprocating the needle, a gripping device located in the path of the needle, a pivoted plate, means for holding said pivoted plate in such position as to force the needle toward the gripping device when the needle passes said plate in one direction, and yielding means for permitting the plate to move out of position when the needle passes in the other direction.

In testimony whereof we have signed our names to this specification in the presence of two subscribing witnesses.

WILLIAM CHARLES MORGANS.
THOMAS GILLOON.

Witnesses:
JNO. F. STEMM,
M. J. GRACE.